(12) United States Patent
Imai et al.

(10) Patent No.: US 6,604,021 B2
(45) Date of Patent: Aug. 5, 2003

(54) COMMUNICATION ROBOT

(75) Inventors: Michita Imai, Kyoto (JP); Hiroshi Ishiguro, Kyoto (JP); Tesuo Ono, Kyoto (JP); Takeshi Maeda, Osaka (JP); Takayuki Kanda, Kyoto (JP)

(73) Assignee: Advanced Telecommunications Research Institute International, Kyoto (JP)

(*) Notice: Subject to any disclaimer, the term of this patent is extended or adjusted under 35 U.S.C. 154(b) by 0 days.

(21) Appl. No.: 09/886,668

(22) Filed: Jun. 21, 2001

(65) Prior Publication Data
US 2002/0198626 A1 Dec. 26, 2002

(51) Int. Cl.$^7$ .............................. G06F 19/00
(52) U.S. Cl. .................. 700/245; 700/56; 700/248; 700/259; 700/260; 700/261; 318/568.11; 318/568.12; 318/560.16; 318/568.19; 901/47; 901/23
(58) Field of Search .................. 700/56, 245, 249, 700/260, 248, 261; 318/568.11, 568.12, 508.16, 568.19; 901/47; 701/23

(56) References Cited

U.S. PATENT DOCUMENTS 5,832,189 A * 11/1998 Tow ........................... 700/259
6,038,493 A * 3/2000 Tow ........................... 700/259
2001/0047226 A1 * 11/2001 Saijo et al. ................. 700/261

OTHER PUBLICATIONS

Ishiguro et al., Robovie: A robot generates episode chanis in our daily life, 2001, Internet, pp. 1–4.*
Imai et al. Physical relation and expression: Joint attention for Human–Robot Interaction, No Date, Internet, pp. 1–7.*
Guzzoni et al., Robots in a distributed agent system, 1998, SRI Internaltional / Cognitive robotics AAAI fall symposium, pp. 1–9.*
Parker,Distributed control of multi–robot teams: Cooperative baton passing task, 1998, Internet, pp. 1–9.*
Ishiguro et al., Robovie: an interaction humanoid robot, Internet, do date, pp. 1–7.*
Kanda et al., Pshychological analysis on human–robot interaction, nodate, pp. 1–8.*

* cited by examiner

Primary Examiner—William A. Cuchlinski, Jr.
Assistant Examiner—McDieunel Marc
(74) Attorney, Agent, or Firm—Gerald T. Bodner

(57) ABSTRACT

A communication robot includes a speaker. By generating a sound or voice through the speaker, the human is requested to cause a robot to make a certain action. When the human makes an action to the robot, the movement of the robot head or arm assists for the action.

19 Claims, 16 Drawing Sheets

COMMUNICATION ROBOT

BACKGROUND OF THE INVENTION

Field of the Invention

This invention relates to a novel communication robot that can communicate with a human through sound generation and head or arm movement.

Recently, a number of robots have been developed. These robots are classified as work robots and pet robots. The work robot deals with work in place of the human in dangerous or worse environments, or carries out routine jobs in place of the human. The pet robot, recently drawing especial attentions, is a robot to be raised in place of an animal by the human. The pet robot can be tamed for the human depending upon how the human has raised (dealt with) and get a particular character (nature).

In any of the conventional robots, however, no emphasis has been placed on the communications with the human. The pet robot, certainly, is designed in advance to react with the actions by the human. However, such a robot, merely "reacting" with the human, cannot have communications with the human. The work robot apparently is not intended for communication with the human.

SUMMARY OF THE INVENTION

Therefore, it is a primary object of the present invention to provide a novel communication robot capable of enhancing intimacy with the human through communications with the human.

A communication robot according to the present invention comprises: a truck; a body provided on the truck; a movable arm attached on the body through the shoulder joint; a head attached on the body through a neck joint; a speaker; and first sound signal providing means for providing a first sound signal to the speaker such that first sound is generated through the speaker to request for the human to make a certain action.

For example, a first sound signal is provided by the first sound signal providing means to generate a voice "Look this" through the speaker when the communication robot request the human to look at an object. For example, a first sound signal is provided by the first sound signal providing means to generate a voice "Kiss me" through the speaker when the communication robot presses the human to kiss. For example, a first sound signal is provided by the first sound signal providing means to generate a voice "Hug me in the arms" through the speaker when the communication robot presses the human to hug it in the arms. Accordingly, the communication robot can call the human through a voice to request a certain action to be made for the communication robot.

In one aspect of the invention, the communication robot further comprises first arm moving means for controlling the shoulder joint to move the movable arm in relation to generation of the request sound such that a movement of the movable arm supplements the first sound.

Similarly, for example, when the communication robot presses the human to hug it in the arms, a sound "Hug me" is generated through the speaker and the movable arm is stretched toward the human. Accordingly, the human is easily known that the communication robot requests the human to hug it in the arms.

In a preferred embodiment, the communication robot further comprises second arm moving means for controlling the shoulder joint to move the movable arm in a manner cooperating with the human when the human makes the action. Accordingly, when the communication robot requests the human to hug, the arm stretched toward the human is bent to hug the human in the arm. That is, the communication robot bends the arm to thereby cooperate with the human and assist the action thereof.

In another aspect of the invention, the communication robot further comprises head moving means for controlling the neck joint to move the head in relation to generation of the first sound such that a movement of the head supplements the request sound.

In this aspect, when the communication robot requests the human to look at an object for example, a voice "Look this" is generated through the speaker and the head moves to point the object. Accordingly, the human can easily find what the communication robot requests to look at. Consequently, the human can correctly respond to the request through the first sound of the communication robot.

Similarly, for example, when the communication robot presses the human to kiss, a sound "Kiss me" is generated and the head is moved obliquely upward. Accordingly, the human is readily known that the communication robot is requesting the human to kiss.

In still another aspect of the invention, the communication robot further comprises second sound signal providing means for providing a second sound signal to the speaker to generate second sound through the speaker after the human have made the action responsive to the request sound.

For example, when the communication robot presses the human to kiss, a voice "Hooray!" is generated through the speaker when the human goes to the near of the communication robot. Accordingly, the human can feel that the action made for the communication robot by the human makes the communication robot happy.

For example, when the communication robot presses the human to hug, a voice "Love most" is generated through the speaker when the human goes to the near of the communication robot.

The communication robot further comprises a touch sensor provided on the truck, wherein the second sound signal providing means provides the second sound signal to the speaker when the touch sensor is on. According to this embodiment, when the communication robot presses the human to kiss, an imitation sound "Chu" is generated through the speaker when the human goes to the near of the communication robot.

The communication robot further comprises: an eye camera provided in the head; position detecting means for detecting a position of a skin-colored part on the basis of an image from the eye camera; and eye camera displacing means for moving the eye camera such that the eye camera is aligned to the position of the skin-colored part. According to this embodiment, when the human face (skin-colored portion) is detected by the eye camera, the human face is caught in the center of the camera. That is, the eye camera tracks the human face so that eye contact can be made between the robot and the human.

Where the body of the communication robot includes a lower body and an upper body and further comprises elevation means for elevating the upper body and height detecting means for detecting a height of the human, the upper body is raised and lowered by the elevation means to make equal the height of the robot to the height of the human. This, accordingly, further smoothen the communication between the robot and the human.

A communication robot according to the present invention comprises: a truck; a body provided on the truck; a movable arm attached on the body through a shoulder joint; a head attached on the body through a neck joint; an eye camera provided in the head; color detecting means for detecting a particular color on the basis of an image from the eye camera; position detecting means for detecting a position of the particular color on the basis of the image from the the camera; and moving means for moving the truck to a position of the particular color.

For example, when the human once goes near the communication robot, a dress color of the human is detected by the color detecting means. When the human goes away, the position detecting means detects a position of the human dress color from among the images of the eye camera. The moving means causes the truck, or communication robot, to a position the human exists.

In one aspect of the invention, the communication robot further comprises sound signal providing means for providing a sound signal to the speaker to generate through the speaker a sound requesting for the human to make a certain action.

Similarly, the communication robot comes near the human once communicated with, and a voice "Love most" is generated through the speaker. Accordingly, the human is readily known that the communication robot has a friendly feeling to that human.

In a preferred embodiment, the communication robot further comprises arm moving means for controlling the shoulder joint to move the movable arm in relation to a generation of the request sound such that a movement of the movable arm supplements the sound. Accordingly, when the communication robot comes near the human and generates a voice "Love most" through the speaker, the movable arm is spread toward the human. That is, the communication robot can clearly visually convey a friendly feeling to the human by spreading the movable arm.

A communication robot according to the invention comprises: a truck; a body provided on the truck; a movable arm attached on the body through a shoulder joint; a head attached on the body through a neck joint; a touch sensor provided on the shoulder joint and the movable arm; and head moving means for moving a head toward a direction that the touch sensor in an on-state exists by controlling the neck joint.

Incidentally, the communication robot further comprises coordinate calculating means for calculating a three-dimensional coordinate having the touch sensor in an on-state, wherein the head moving means controllers the neck joint such that the head is directed toward a direction of the three-dimensional coordinate calculated by the coordinated calculating means.

For example, if the human touches the shoulder of the communication robot, the communication robot directs its head toward the shoulder the human has contacted. Accordingly, the human can easily understand that the communication robot understand the contact at the shoulder, i.e. skin-ship being conveyed.

A communication robot according to the invention comprises: a truck; a body provided on the truck; a movable arm attached on the body through a shoulder joint; a head attached on the body through a neck joint; a speaker; communication means for exchanging data with another communication robot; and sound signal providing means for providing a sound signal to the speaker to generate a sound informing a human of communication made by the communication means through the speaker.

For example, where the communication robot exchanges data with another robot, a voice "Hello!" is generated through the speaker of one communication robot in data transmission. Accordingly, the human is known that the one communication robot is in communication with the other communication robot.

In a preferred embodiment, the communication robot further comprises head moving means for controlling the neck joint to move the head in relation to a generation of the sound such that the movement of the head supplements the sound. Accordingly, when the communication robot transmits data to another communication robot and generates a voice "Hello!", it makes a greeting with the head directed down. That is, the communication robot can easily convey to the human that it is communicating with another communication robot.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
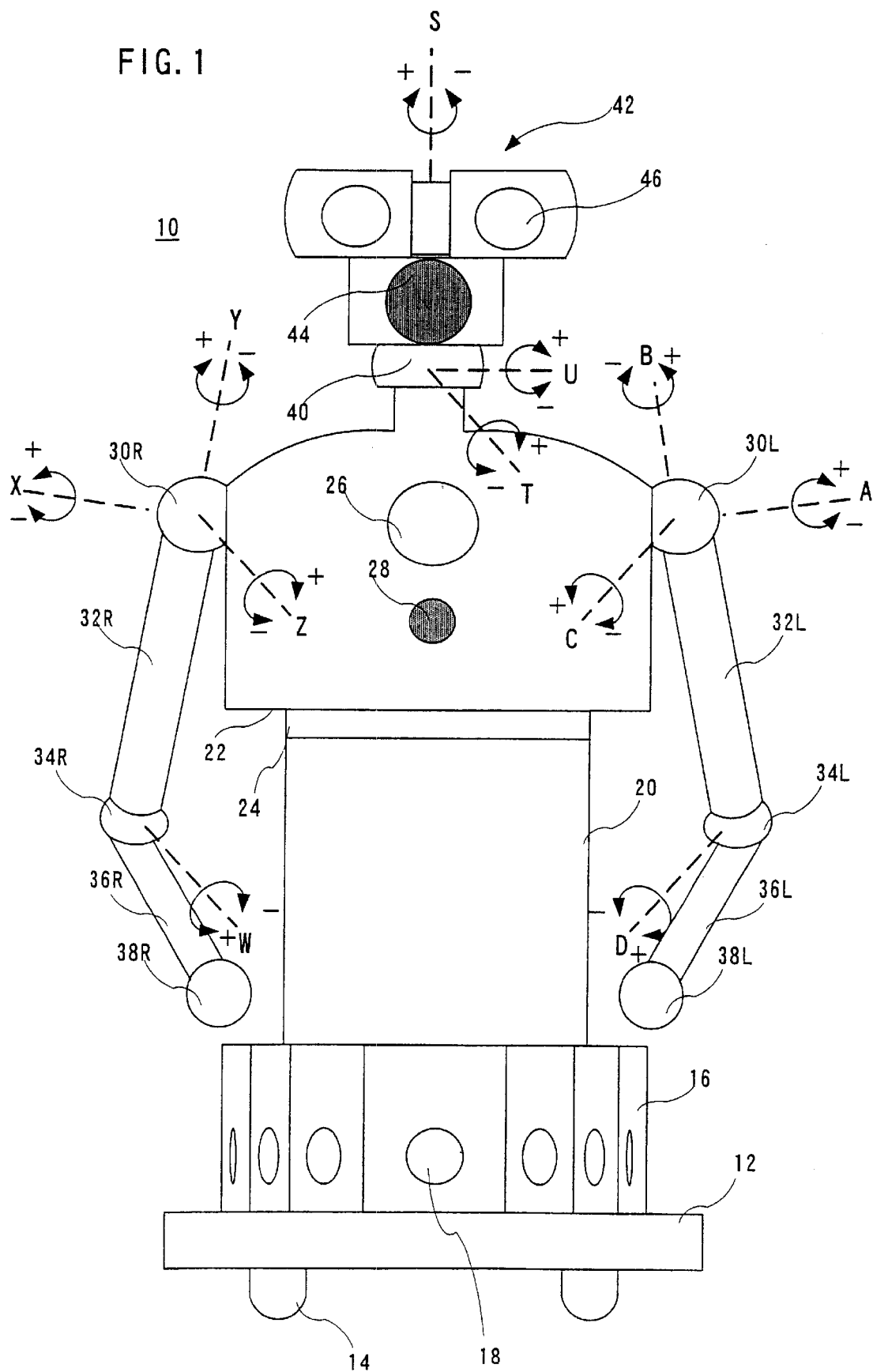
FIG. 1 is a front view schematically showing a communication robot according to an embodiment of the present invention.

The communication robot of this embodiment shown in FIG. 1 (hereinafter, may be referred merely to as "robot") 10 includes a truck 12. The truck 12 has, in its lower surface, wheels 14 to self-move the robot 10. The wheels 14 are driven by wheel motors (shown at reference numeral "70" in FIG. 2) to move the truck 12, or robot 10, in an arbitrary direction of forward, backward, leftward or rightward. Incidentally, although not shown, the truck 12 has touch sensors (shown at reference numeral "72" in FIG. 2) mounted on a front surface thereof. The touch sensors are to detect a contact of the truck 12 with a human or other obstacles.

Incidentally, the robot 10 in this embodiment has a height of approximately 100 cm in order not to impose a coercive feeling on the human, particularly children. However, the height may be desirably changed.

A sensor-mount panel 16 is provided on the truck 12. Ultrasonic distance sensors 18 are provided on the surfaces of the sensor-mount panel 16. The ultrasonic distance sensors 18 are to measure a distance, mainly to a human around the mount panel 16, or robot 10.

On the truck 12, further mounted are bodies 20 and 22 of the robot 10 that stand upright with the lower part surrounded by the mount panel 16. The body includes a lower body 20 and an upper body 22. The lower body 22 and the upper body 22 are connected together by a connecting part 24. The connecting part 24, although not shown, incorporates an elevation mechanism. By using the elevation mechanism, the upper body 22 can be changed in height, i.e. robot 10 height. The elevation mechanism (not shown) is driven by a waist motor (shown at reference numeral "68" in FIG. 2), as hereinafter referred. The foregoing height of 100 cm of the robot 10 is a value provided when the upper body 22 is positioned in the lowermost position. Accordingly, the height of the robot 10 can be increased up to 100 cm or higher.

The upper body 22 has an omnidirectional camera 26 and mike 28 provided nearly in the center thereof. The omnidirectional camera 26 is to take pictures of the surroundings of the robot 10, and provided separately from an eye camera 46 hereinafter referred. The mike 28 is to take ambient sound, particularly human voice.

The upper body 22 has, on the both shoulders, arms 32R and 32L respectively attached through shoulder joints 30R and 30L. The shoulder joints 30R and 30L each possess a freedom of three axes. That is, the shoulder joint 30R puts the arm 32R under control of the angle about the axes of X, Y and Z. The Y-axis is an axis parallel with a longitudinal direction (or axis) of the arm 32R while the X-axis and Z-axis are axes orthogonal to the Y-axis in different directions from each other. The shoulder joint 30L puts the arm 32L under control about the axes of A, B and C. The B-axis is an axis parallel with a longitudinal direction (or axis) of an upper arm 32L while the A-axis and the B-axis are axes perpendicular to the B-axis differently in directions from each other.

The arms 32R and 32L have respective front arms 36R and 36L attached through elbow joints 34R and 34L. The elbow joints 34R and 34L puts the front arms 36R and 36L under control of angle about the W-axis axis and the D-axis.

In addition, as to each of the axes X, Y, Z, W, A, B, C and D for controlling the changes in position of the arms 32R and 32L and the front arms 36R and 36L (all in FIG. 1), "0 degrees" is the home position, and at the home positions, these arms 32R, 32L, 36R and 36L are directed downward.

Incidentally, although not shown, touch sensors are provided in the shoulder parts of the upper body 22, the arms 32R and 32L and the front arms 36R and 36L. These touch sensors are to detect whether or not a human contacts such a point of the robot 10. These touch sensors are collectively shown at reference numeral 72 in FIG. 2.

The front arms 36R and 36L respectively have spheres 38R and 38L corresponding to the hands fixedly attached at the tips thereof. Incidentally, it is possible to use, in place of the spheres 38R and 38L, "hands" in the form of human hands in the case that finger functions are needed differently from the robot 10 of this embodiment.

A head 42 is mounted on a center of the upper body 22 through a neck joint 40. The neck joint 40 possesses three freedoms of the angular control about the S-axis, the T-axis and U-axis. The S-axis is an axis extending above from the neck while the T-axis and the U-axis respectively are axes perpendicular to the S-axis differently in directions. The head 42 has a speaker 44 provided in a position corresponding to that of the human mouth, and eye cameras 46 provided in positions corresponding to the eyes. The speaker 44 is used for the robot 10 to communicate with a person in the around through sound or voice. The eye camera 46 takes pictures of the face or other portions of a person who is approaching the robot 10. Note that the speaker 44 may be provided in another position of the robot 10, e.g. on the body.

Incidentally, the both of the omnidirectional camera 26 and the eye cameras 46 may be cameras using solid state imaging devices such as CCD or CMOS.

Figure 16:
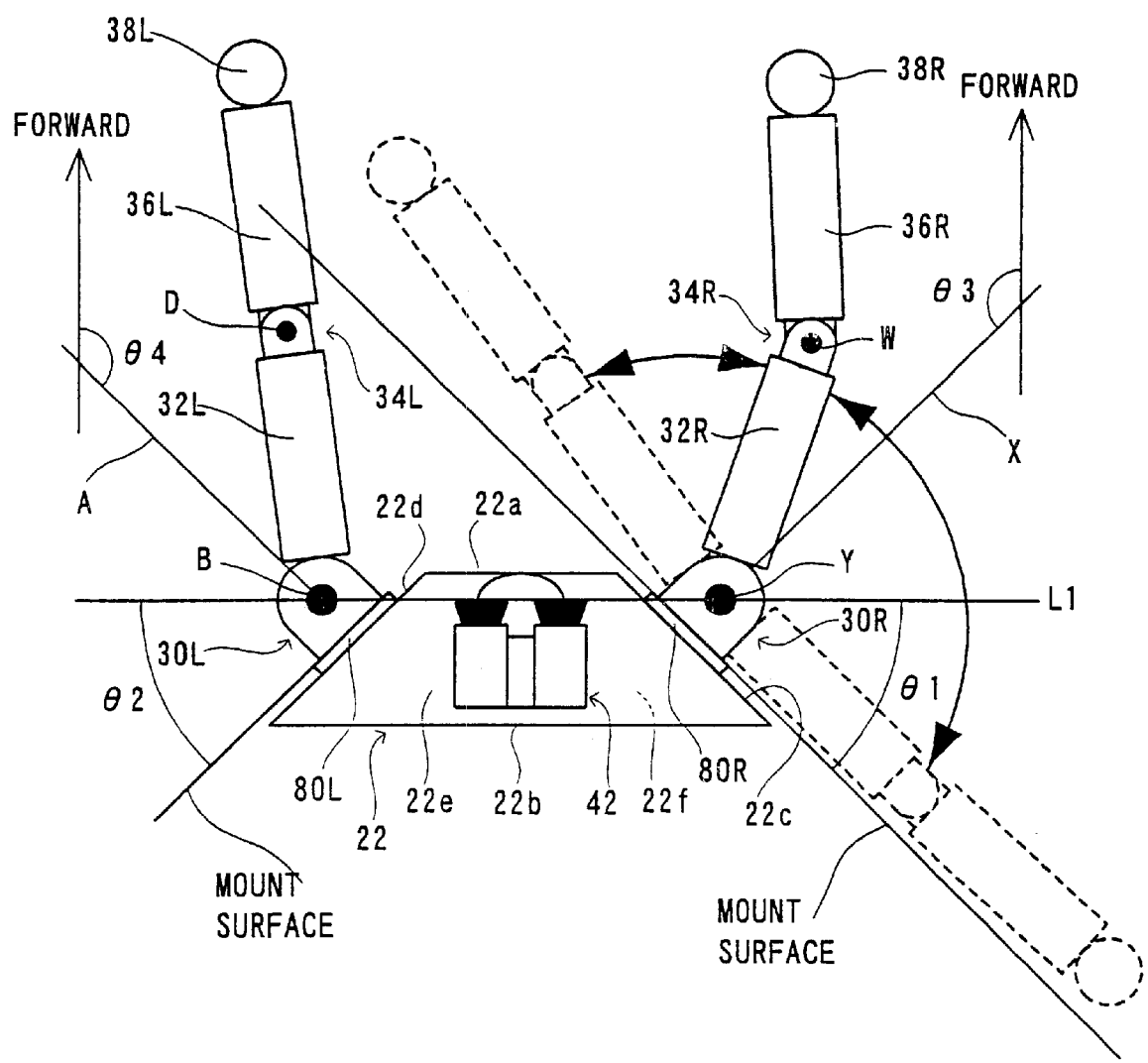
FIG. 16 is an illustrative top view of the communication robot according to an embodiment of the present invention and showing in detail the movement of the upper and lower portions of the arms of the robot.

Meanwhile, as shown in FIG. 16, the upper body 22 includes a front surface 22a, a back surface 22b, a right side surface 22c, a left side surface 22d, a top surface 22e and a bottom surface 22f. The right side surface 22c and the left side surface 22d may be formed such that the surfaces are faced to the oblique forward. That is, the upper body 22 at the top surface 22e and bottom surface 22f is formed in a trapezoid form. In such a case, the arms of the robot 10 at the shoulder joints 30R and 30L are attached on the right side surface 22c and the left side surface 22d through the support portions 80R and 80L. Incidentally, the support portions 80R and 80L have surfaces respectively parallel with the right side surface 22c and the left side surface 22d. As in the forgoing, the upper arm 32R is rotatable about the Y-aixs and the upper arm 32L is rotatable about the B-axis. However, the rotation range of the upper arm 32R and upper arm 32L is restricted by the surfaces (mount surfaces) of the support portions 80R and 80L. Consequently, the upper arms 32R and 32L will not rotate beyond the attaching surface.

As can be understood from FIG. 16, the angle θ1 given between a connection line L1 connecting between the shoulder joint 30R as a base end of the upper arm 36R and the shoulder joint 30L as a base end of the upper arm 26L and the right side surface 22c (mount surface) satisfies a condition of 0<θ1<90. The angle θ2 given between the connection line L1 and the left side surface 2d also satisfies a condition of 0<θ2<90. Because the connection line L1 is orthogonal to the forward direction of the robot 10, the angel θ3 given between the X-axis vertical to the right side surface 22c and the forward direction equals "180−θ1" and the angle θ4 given between the A-axis vertical to the left side surface 22d and the forward direction also equals "180−θ2". Incidentally, it is preferred that the angles θ1 and θ2 respectively satisfy the conditions of 30≦θ1≦70 and 30≦θ2≦70. Furthermore, provided that the upper arms 32R and 32L each have a length of 230 mm, the front arms 36R and 26L have a length of 135 mm and the distance between the Y-axis and the B-axis is 518 mm, the angles θ1 and θ2 are preferably 60. In this case, the angles θ3 and θ4 are 120.

With this structure, because the upper arms 32R and 32L are allowed to rotate to an inward beyond the front, the arms of the robot 10 can intersect at the front unless a freedom is given by the W-axis and D-axis. Accordingly, even where there is less freedom in the arms, intimate communications are feasible including hugging in the arms mutually the persons who is in the front.

Figure 2:
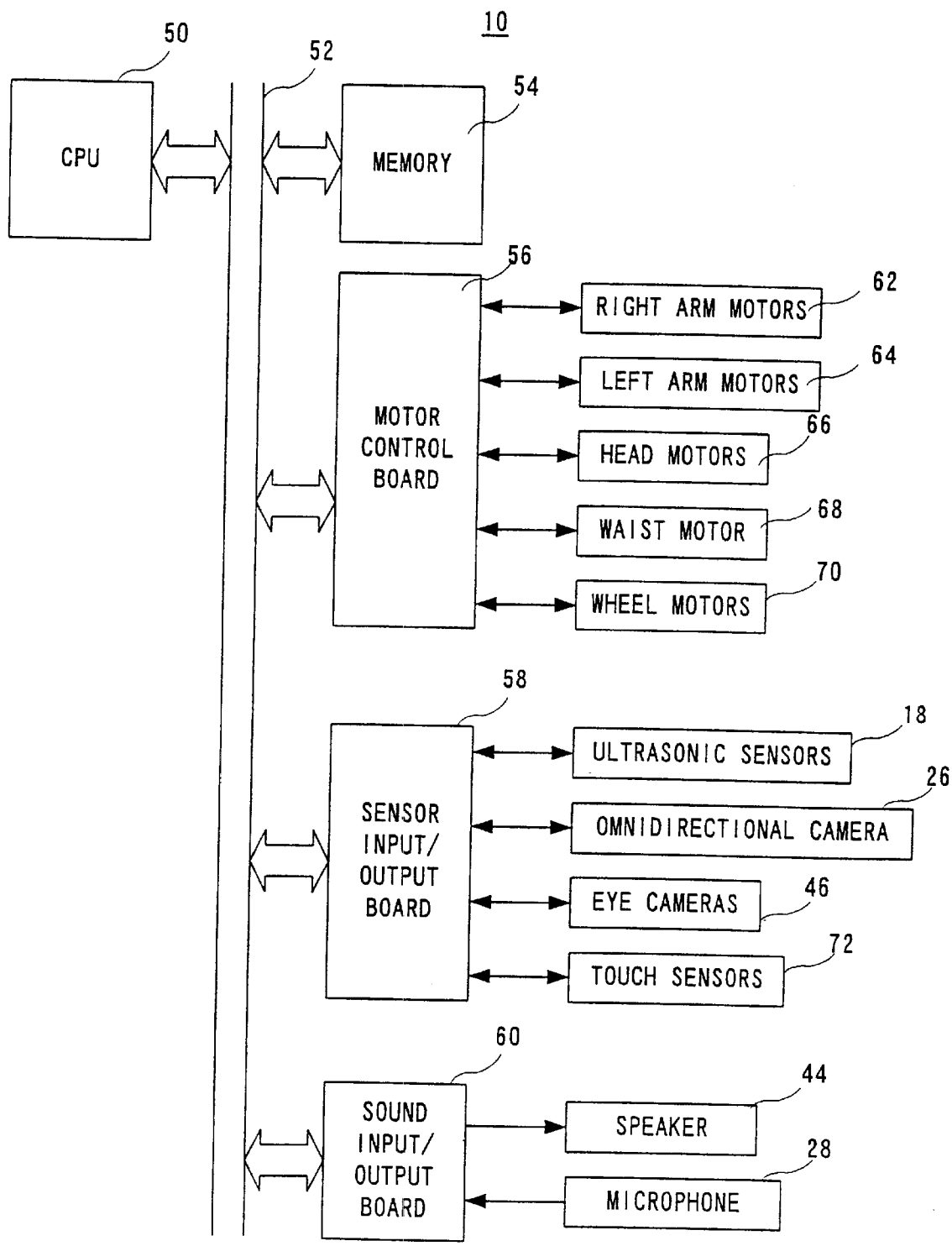
FIG. 2 is a block diagram showing an electrical configuration of the robot of the FIG. 1 embodiment.

FIG. 2 shows a block diagram of an electric configuration of the robot 10 of FIG. 1. As shown in FIG. 2, the robot 10 includes a microcomputer or CPU 50 in order for the overall control. The CPU 50 is connected, through a bus 52, with a memory 54, a motor control board 56, a sensor input/output board 58 and a sound input/output board 60.

The memory 54 includes, although not shown, a ROM or RAM. The ROM is written previously with a control program for the robot 10, and stores the data of sound or voice to be generated through the speaker 44. The RAM is used as a temporary storage memory and utilized as a working memory.

The motor control board 56 is configured, for example, of a DSP (Digital Signal Processor) to control the axis motor for the arms and head. That is, the motor control board 56 receives control data from the CPU 50, and adjusts the rotation angle of totally four motors (collectively shown as "right arm motors" in FIG. 2), i.e. three motors for controlling the respective angles of the X, Y and Z-axes on the right shoulder joint 30R and one motor for controlling the angle of the axis W on the right elbow joint 34R. Meanwhile, the motor control board 56 adjusts the rotation angle of the totally four motors (collectively shown as "left arm motors" in FIG. 2) 64, i.e. three motors for controlling the respective angles of A, B and C-axes on the left shoulder joint 30L and one motor for controlling the angle of the D-axis on the left elbow joint 34L. The motor control board 56 also adjusts the rotation angles of three motors (collectively shown as "head motors" in FIG. 2) 66, to control the respective angles of the S, T and U-axes on the head 42. The motor control board 56 also controls the waist motor 68 and the two motors (collectively shown as "wheel motors" in FIG. 2) 70 for driving the wheels 14.

Incidentally, although the foregoing motors of this embodiment excepting the wheel motors 70 are stepping motors or pulse motors in order for amplification of control, they may be direct-current motors similarly to the wheel motors 70.

The sensor input/output board 58 is similarly configured with a DSP to fetch signals from the sensors or cameras to be supplied to the CPU 50. That is, through this sensor input/output board 58 the data related to reflection time from each ultrasonic distance sensors 18 is inputted into the CPU 50. Also, the image signal from the omnidirectional camera is subjected to a predetermined process as required in the sensor input/output board 58, and then inputted to the CPU 50. The image signal from the eye cameras 46 is similarly supplied to the CPU 50. Incidentally, in FIG. 2 the touch sensors as were explained in FIG. 1 are, collectively, represented as "touch sensors 72". The signals from the touch sensors 72 are inputted to the CPU 50 through the sensor input/output board 58.

Incidentally, the speaker 44 is given synthesized sound data from the CPU 50 through the sound input/output board 60. In response, the speaker 44 outputs sound or voice according to the data. The sound input through the mike 28 is taken into the CPU 50 through the sound input/output board 60.

The detailed actions of the robot 10 configured as above will be explained with reference to the corresponding flowcharts.

Figure 3:
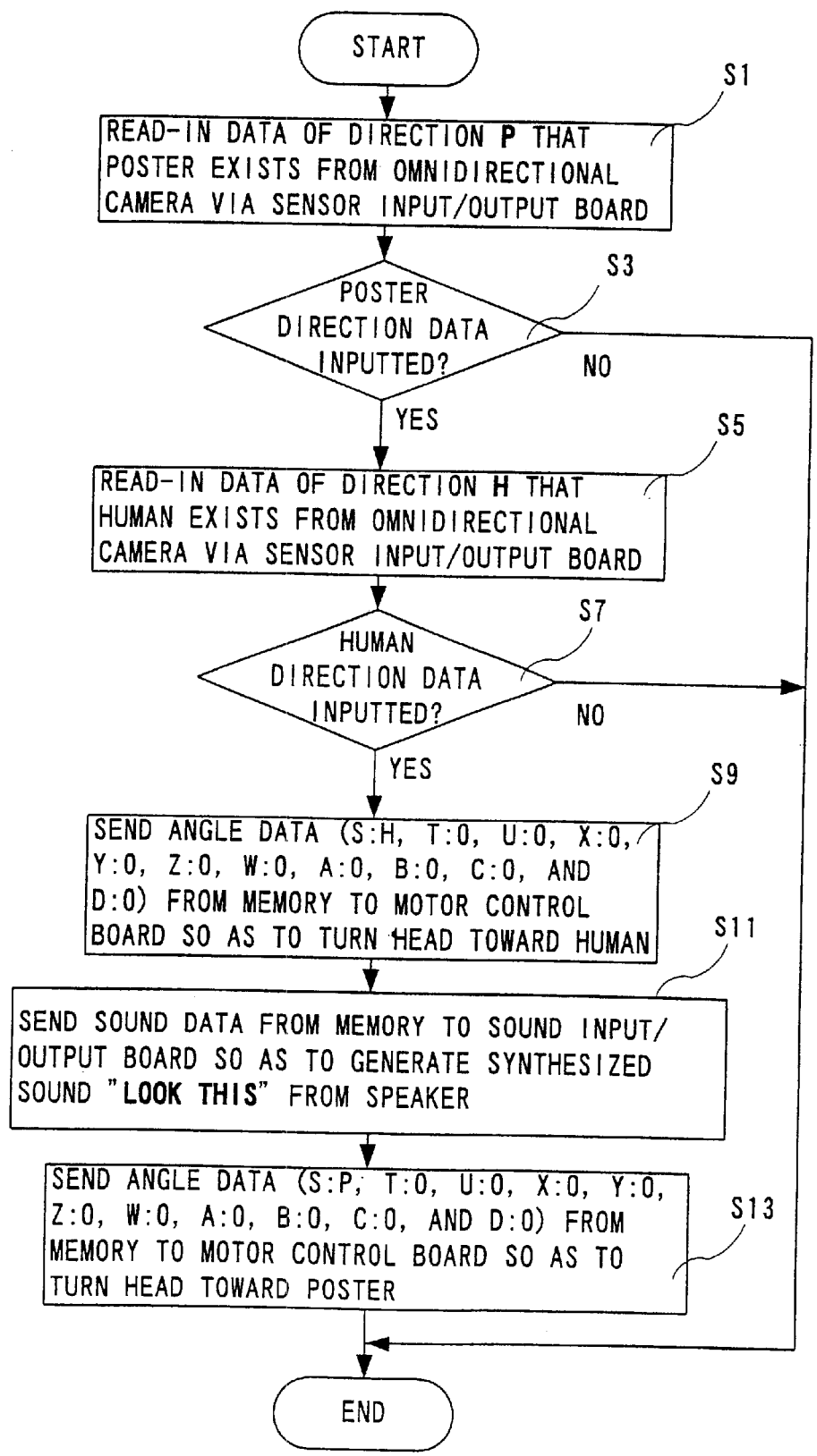
FIG. 3 is a flowchart showing an action that for the human the robot points an object.

FIG. 3 shows a flowchart representing the actions that for the human the robot 10 points an object (a poster in this embodiment), thereby prompting the human to look at the poster.

In the first step S1 of FIG. 3, the image signal from the omnidirectional camera 26 is taken into the sensor input/output board 58. The image signal is processed in the board 58 to detect a direction P of the object (poster) as viewed from the robot 10. Accordingly, in the step S1, the CPU 50 reads the data of the poster (not shown) direction P from the sensor input/output board 58. In step S3, the CPU 50 determines whether the data of that direction P has been inputted from the sensor input/output board 58 or not. If "NO" in the step S3, the process directly ends.

If "YES" in the step S3, i.e. if the data of the poster direction P is inputted to the CPU 50, the CPU 50 in the next step S5 takes in the data of a human direction H. That is, the image signal from the omnidirectional camera 26 is taken into the sensor input/output board 58. The image signal is processed in this board 58 to detect a direction H of the human (not shown) as viewed from the robot 10. Consequently, in the step S5 the CPU 50 reads the data of the human direction H from the sensor input/output board 58. Then, the CPU 50 in step S7 determines whether the data of that direction H has been inputted from the sensor input/output board 58 or not. If "NO" in the step S7, the process directly ends.

If "YES" is determined in the step S7, the CPU 50 in the next step S9 forwards angle data from the memory 54 to the motor control board 56 so that the head 42 of the robot 10 (FIG. 1) can be directed toward the human. Specifically, an angle "H" is provided to the motor for adjusting the rotation angle on the S-axis shown in FIG. 1 while an angle "0" is to all the remaining motors. Accordingly, in the step S9 the head 42 of the robot 10 is rotated by an angle H about the S-axis thereby directing the head 42 toward the direction H of the human.

Incidentally, a home position "0 degree" is provided on the axes of X, Y, Z and W and axes of A, B, C and D for controlling the movement of the arms 32R and 36L and front arms 36R and 36L (each in FIG. 1). In the home position, the arms 32R and 32L and the front arms 36R and 36L are positioned down.

In the following steps S11, the CPU 50 forwards sound data from the memory 54 to the sound input/output board 60. Consequently, synthesized voice "Look this" is outputted through the speaker 44.

In the next step S13, the CPU 50 forwards angle data from the memory 54 to the motor control board 56 so that the head 42 of the robot 10 can be directed toward the object (poster). Specifically, an angle "P" is provided to the motor for adjusting the rotation angle on the S-axis shown in FIG. 1 while an angle "0" is given to all the remaining motors. Consequently, in the step S13 the head 42 of the robot 10 is rotated by an angle P about the S-axis, thereby directing the head 42 toward the direction P of the poster.

In this manner, in the step S9 the head 42 of the robot 10 is directed toward the human. Furthermore, in the step S11 the sound "Look this" is generated from the robot 10, and in the step S13 the head 42 of the robot 10 is directed toward the poster. Accordingly, the human will behave in a manner according to the sound as generated from the robot 10. In this case, the human will look at the poster as pointed by (the head 42 of) the robot 10. In this manner, the robot 10 in this embodiment can communicate with the human through actions and sound.

Figure 4:
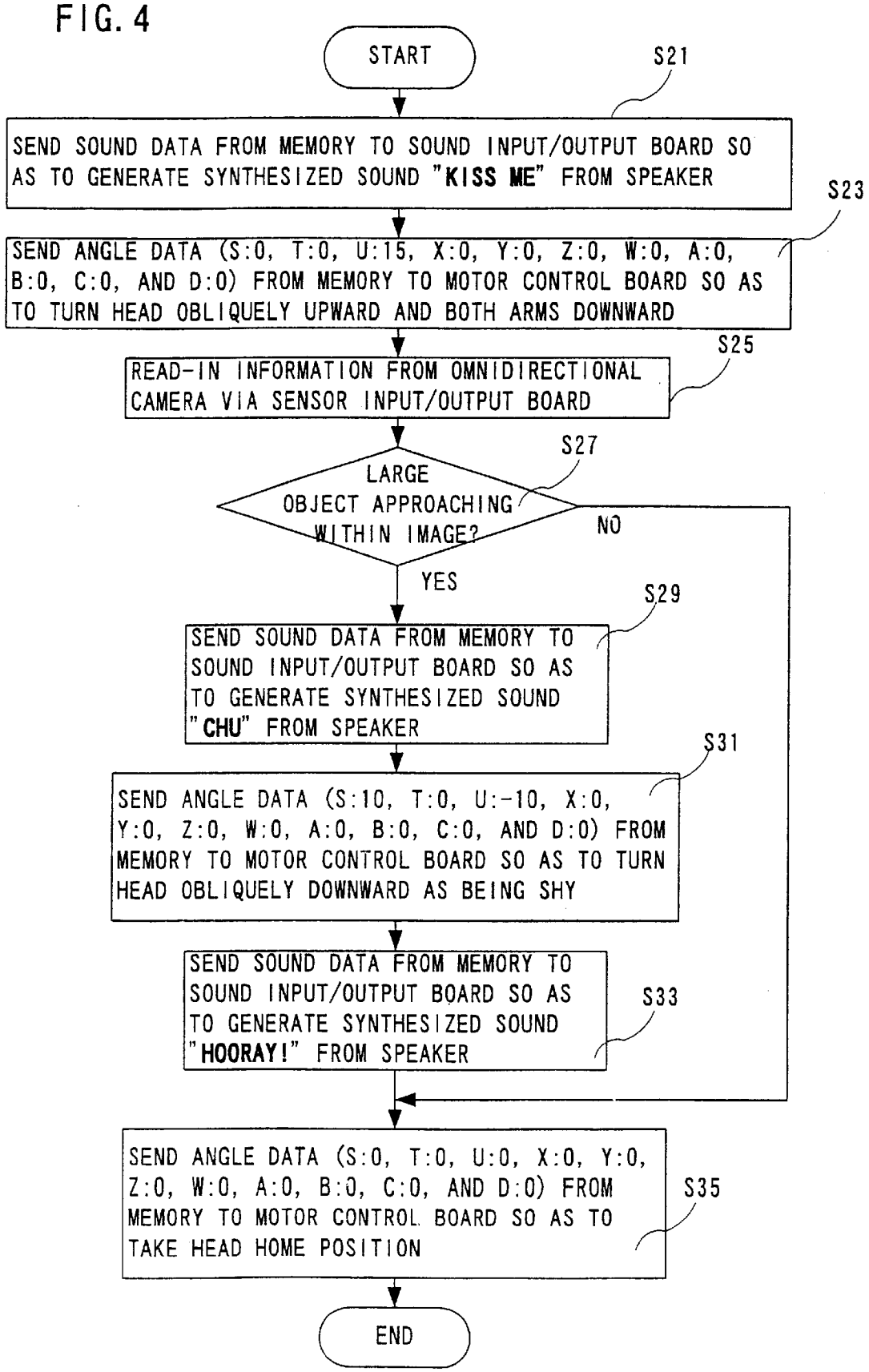
FIG. 4 is a flowchart showing an action that the robot asks the human to kiss.

FIG. 4 is a flowchart showing the action that the robot 10 presses the human to kiss thereby prompting the human to kiss the robot 10.

In the first step S21 of FIG. 4, the CPU 50 forwards sound data from the memory 54 to the sound input/output board 60. Consequently, synthesized voice "Kiss me" is outputted through the speaker 44.

In step S23, the CPU 50 forwards angle data from the memory 54 to the motor control board 56 so that the head 42 of the robot 10 (FIG. 1) can be directed up and the arm down. Specifically, an angle "15" is provided to the motor for adjusting the rotation angle on the U-axis shown in FIG. 1 (not shown) while an angle "0" is given to all the remaining motors. Accordingly, in the step S23 the head 42 of the robot 10 is rotated by an angle of 15 degrees about the U-axis so that the head 42 is directed obliquely upward in a manner looking up the human. Incidentally, the arms 32R and 32L and the front arms 36R and 36L are set "0 degree" on the axes of X, Y, X and W and axes of A, B, C and D, thereby being put in the home position, i.e. the arms 32R and 32L and the front arms 36R and 36L are directed down.

In the following step S25, the CPU 50 fetches an image signal from the omnidirectional camera 26 through the sensor input/output board 58. Then, it is determined in step S27 whether, in the image signal, a big object is approaching the robot 10 or not. That is, in the step S27, it is determined whether the human is approaching the robot 10 responsive to a call from the robot 10 to the human.

If "YES" in step S27, the CPU 50 forwards sound data from the memory 54 to the sound input/output board 60. Accordingly, synthesized voice "Chu" is outputted through the speaker 44. The voice "Chu" is "imitation sound" representative of kiss.

In the next step S31, the robot 10 behaves shy. That is, in this step S31 the CPU 50 forwards angle data from the memory 54 to the motor control board 56 to direct the head 42 of the robot 10 obliquely downward. Specifically, the motor for adjusting the rotation angle on the U-axis is given an angle "−10" while all the remaining motors are given an angle "0". Accordingly, in the step S31, the head 42 of the robot 10 is rotated by an angle of −10 degrees about the U-axis and the head 42 is directed obliquely downward, thereby representing the robot 10 is shy.

Then, the CPU 50 in step S33 forwards sound data from the memory 54 to the sound input/output board 60. Consequently, synthesized voice "Hooray" is outputted through the speaker 44.

After the step S33 or the determination of "NO" in the step S27, the CPU in the next step S35 forwards angle data from the memory 54 to the motor control board 56, to return the head 42 of the robot 10 to the home position. Specifically, all the motors are given an angle "0". Accordingly, in the step S35 the head 42 of the robot 10 returns to the home position (not rotated and standing upright).

In this embodiment of FIG. 4, when the human approaches the robot 10 responsive to the call "Kiss me" of the robot 10, imitation voice for kiss is generated from the robot 10 and the robot 10 behaves shy. Accordingly, in also this embodiment the robot 10 can communicate with the human through actions and sound.

Figure 5:
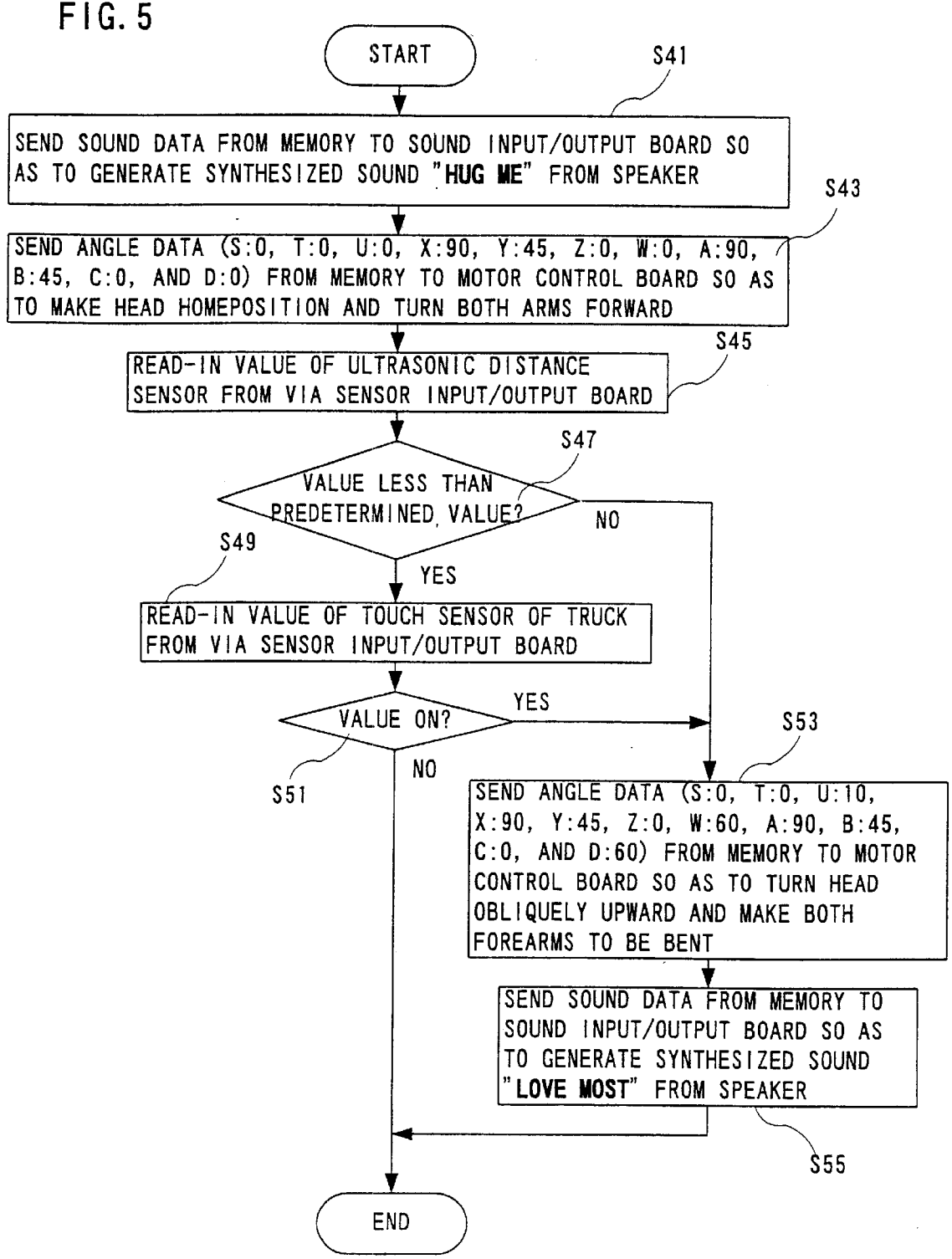
FIG. 5 is a flowchart showing an example of an action that the robot asks the human to hug it in the arms.

FIG. 5 is a flowchart showing the action that the robot 10 presses the human to hug in the arms thereby prompting the human to hug the robot 10 in the arms.

In the first step S41 of FIG. 5, the CPU 50 forwards sound data from the memory 54 to the sound input/output board 60. Accordingly synthesized voice "Hug me" is outputted through the speaker 44.

The CPU 50 in step S43 forwards angle data from the memory 54 to the motor control board 56 such that the head 42 of the robot 10 is put in its home position with the arms directed forward. Specifically, the motor for adjusting the rotation angle on the X-axis and A-axis shown in FIG. 1 is given an angle "90", the motor for adjusting the rotation angle on the Y-axis and B-axis is given an angle "45" and all the remaining motors are given an angle "0". Accordingly, in the step S43 the head of the robot 10 stands upright and the arms 32R and 32L are rotated by 90 degrees about the X-axis and A-axis and by 45 degrees about the Y-axis and B-axis. Consequently, the arms 32R and 32L are stretched forward of the robot 10 in a state in line with the arms 36R and 36L. The state expresses that the robot 10 is pressing for "hugging".

In the following step S45, the CPU 50 fetches a distance value from the ultrasonic distance sensor 18 (FIG. 1) through the sensor input/output board 58. That is, in the step S45 the signal from the ultrasonic distance sensor 18 is inputted to the sensor input/output board 58. In response, in the board 58 a ultrasonic wave is launched from the ultrasonic distance sensor 18 to measure the timing that the ultrasonic wave is reflected from the human and then incident onto the ultrasonic distance sensor 18. The data representative of a distance value between the robot 10 and the human is supplied to the CPU 50.

The CPU 50 in the next step S47 determines whether the distance data inputted from the sensor input/output board 58 is equal to or smaller than predetermined value or not. The "distance" equal to or smaller than the predetermined value means that the human came to the near of the robot 10. If "YES" is determined in the step S47, the CPU 50 in the succeeding step S49 reads a value of a touch sensor (not shown) on a front surface of the truck 12. Then, the CPU 50 in step S51 determines whether the read value from the touch sensor shows "touch sensor ON" or not.

If "YES" is determined in the step S51, i.e. if it is determined that the human came near the robot 10 and contacted the front surface of the truck 12 of the robot 10, the CPU 50 in the next step S53 forwards angle data from the memory 54 to the motor control board 56 so that the head 42 of the robot 10 is directed obliquely upward and the arms 36R and 36L are bent. Specifically, the motor for adjusting rotation angle on the U-axis of FIG. 1 is given an angle "10", the motors on the X-axis and A-axis are given an angle "90", the motors on the Y-axis and B-axis are given in angle "45", the motors on the W-axis and D-axis are given an angle "60" and all the remaining motors are given an angle "0". Accordingly, in the step S53 the head 42 of the robot 10 is rotated upward by an angle of 10 degrees about the U-axis so that the head is directed obliquely upward and the front arms 36R and 36L are bent in order to hug the human in the arms of the robot 10.

Finally, the CPU 50 in step S55 forwards sound data from the memory 54 to the sound input/output board 60. Consequently, synthesized voice "Love most" is outputted through the speaker 44.

In the embodiment of FIG. 5, when in this manner the human comes near the robot 10 responsive to a call "Hug me" from the robot 10, the arms of the robot 10 wrap over the human into a form of "hugging".

In the FIG. 5 embodiment, the robot 10 calls the human who would be near the robot 10 so that the human can respond to it. That is, in the FIG. 5 embodiment the robot 10 issued speak regardless of whether the human is certainly exits in the around. Contrary to this, in the FIG. 6 embodiment, the robot 10 when sensing the presence of a human calls "Hug me" to the human.

Figure 6:
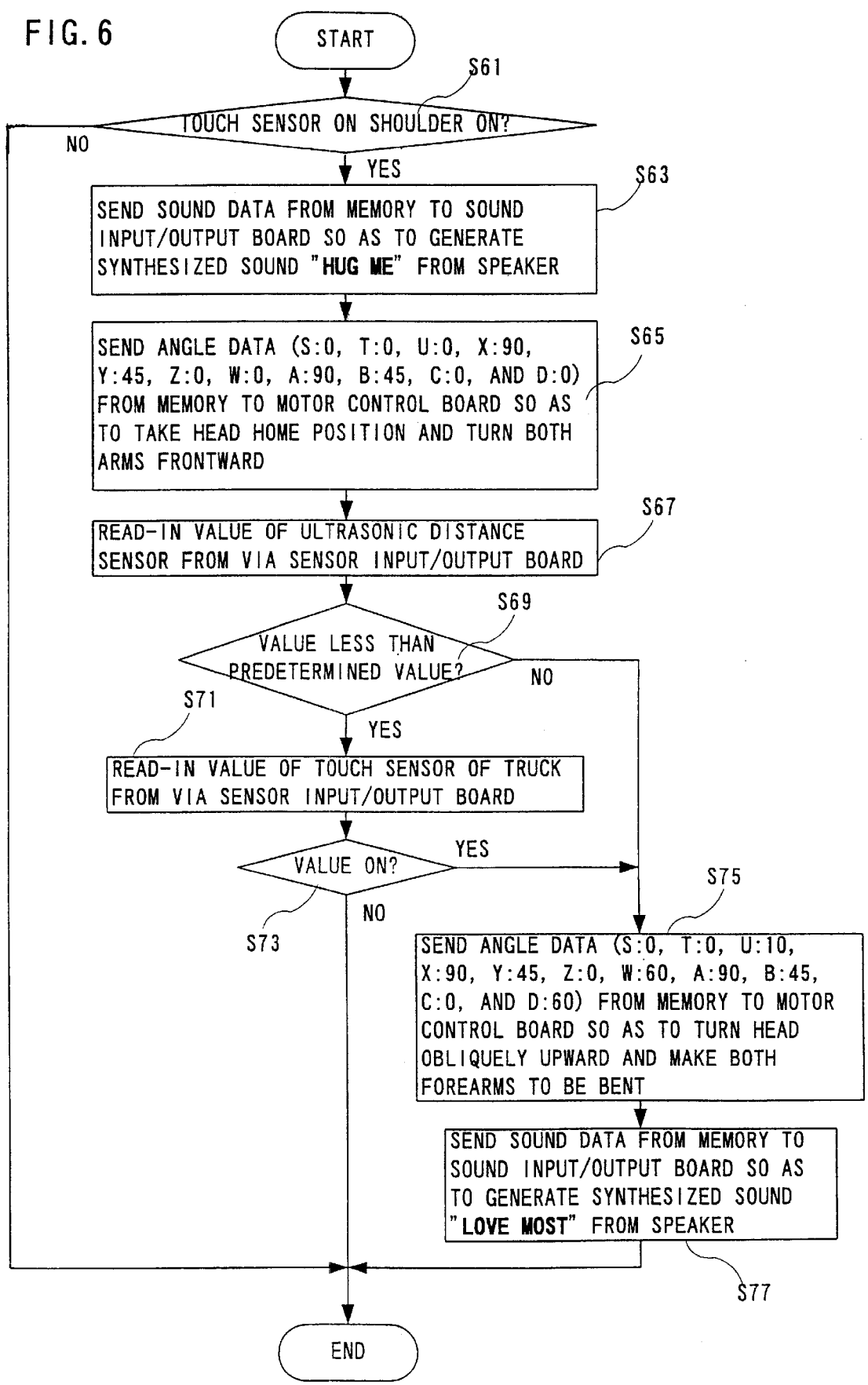
FIG. 6 is a flowchart showing a further example of an action that the robot asks the human to hug it in the arms when it senses the presence of the human.

In the first step S61 of FIG. 6, the CPU 50 determines whether there is an input from the touch sensors (not shown) provided on the shoulder or not. That is, it is determined whether the human has contacted the shoulder of the robot 10 or not. Note that the step S61 may utilize signal from the touch sensors provided on the arms or front arms.

If the presence of a human is sensed in step S61, the steps S63 to S77 are subsequently executed. However, the steps S63, 65, 67, 69, 71, 73, 75 and 77 of FIG. 6 are similar to the steps S41, 43, 45, 47, 49, 51, 53 and 55 of FIG. 5 above, and duplicated explanations are omitted.

Figure 7:
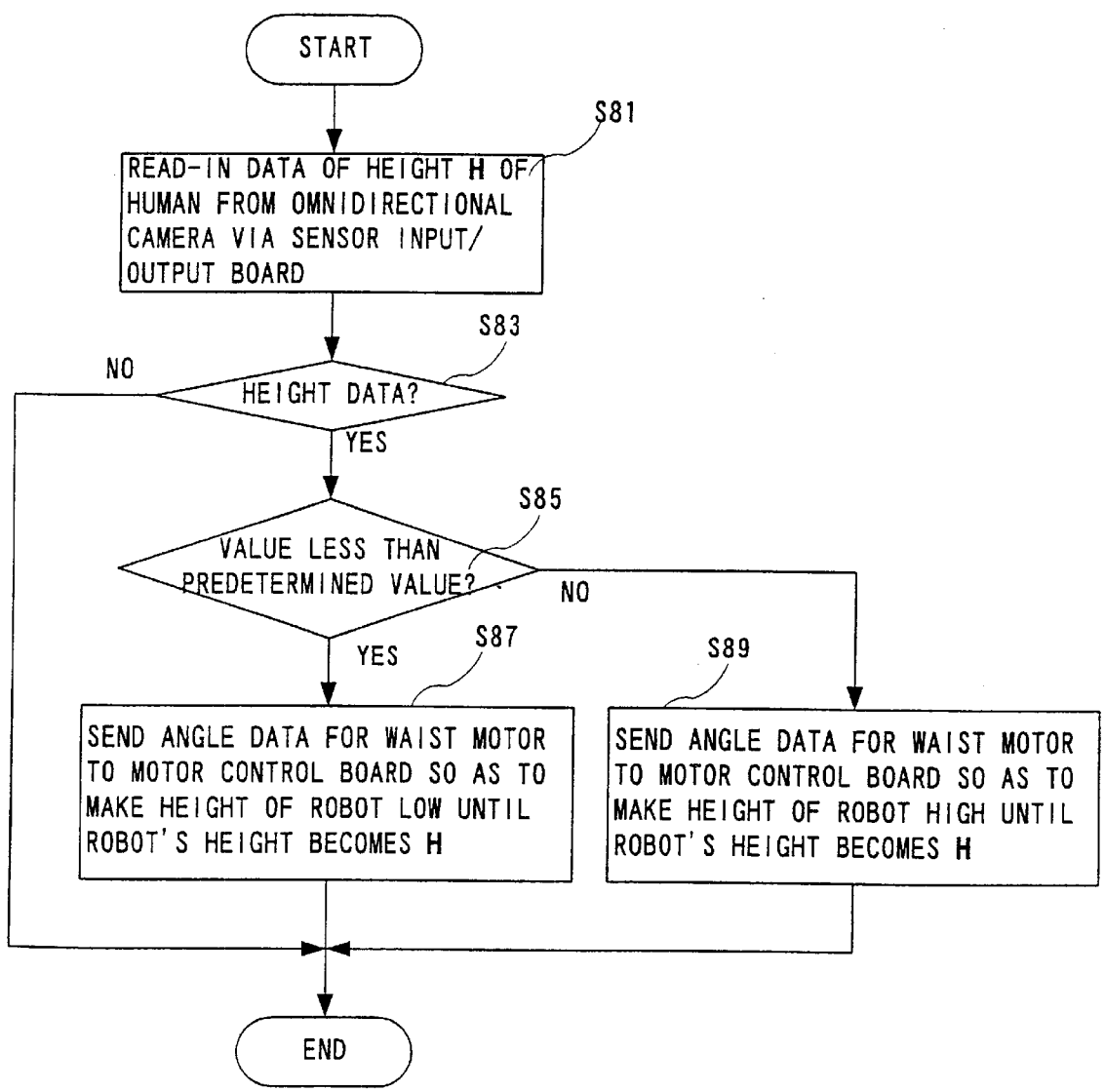
FIG. 7 is a flowchart showing another example of an action that the robot asks the human to hug it in the arms.

FIG. 7 is a flowchart showing an action in an embodiment that the robot 10 measures a human height and adjust the height of the robot 10 to the same thereby smoothing the communications between the robot 10 and the human.

In the first step S81 of FIG. 7, the CPU 50 of the robot 10 fetches the data of a human height from the omnidirectional camera 26 through the sensor input/output board 58. That is, the image signal from the omnidirectional camera 26 is taken into the sensor input/output board 58. The image signal is processed in the board 58 thereby detecting a height H of the human (not shown) existing nearby the robot 10. Consequently, in the step S81 the CPU 50 reads in the data of a human height from the sensor input/output board 58.

In step S83 the CPU 50 determines whether or not height data is contained in the data read in the step S81. If "NO" in this step S83, the process directly ends. However, if "YES", the CPU 60 in the next step S85 determines whether the human height H is smaller than a predetermined value or not.

When it is determined in the step S85 that the human height H is smaller than the predetermined value (e.g. robot 10 height), i.e. when "YES" is determined in the step S85, the CPU 50 provides the motor control board 56 with angle data to rotate the waist motor 68 in the minus direction. Accordingly, the waist motor 68 (FIG. 2) of the robot 10 is driven in the minus direction thereby descending the upper body 22 (FIG. 1). Consequently, the height of the robot 10 is lowered to the human height.

When it is determined in the step S85 that the human height H is greater than the predetermined value, i.e. when "NO" is determined in the step S85, the CPU 50 provides the motor control board 56 with angle data to rotate the waist motor 68 in a plus direction. Accordingly, the waist motor 68 of the robot 10 is driven in the plus direction thereby ascending the upper body 22. Consequently, the height of the robot 10 is increased to the human height H.

According to the embodiment of FIG. 7, the human and the robot 10 are made equal in height thus smoothing the communications between the both. However, there is not necessarily a need of making the robot 10 height equal to the human height. In order not to impose a coercive feeling on the human, it is also possible to control the robot 10 height somewhat smaller than the human height by the utilization of the FIG. 7 embodiment. Naturally, it is also possible to conversely control the robot 10 height greater than the human.

Figure 8:
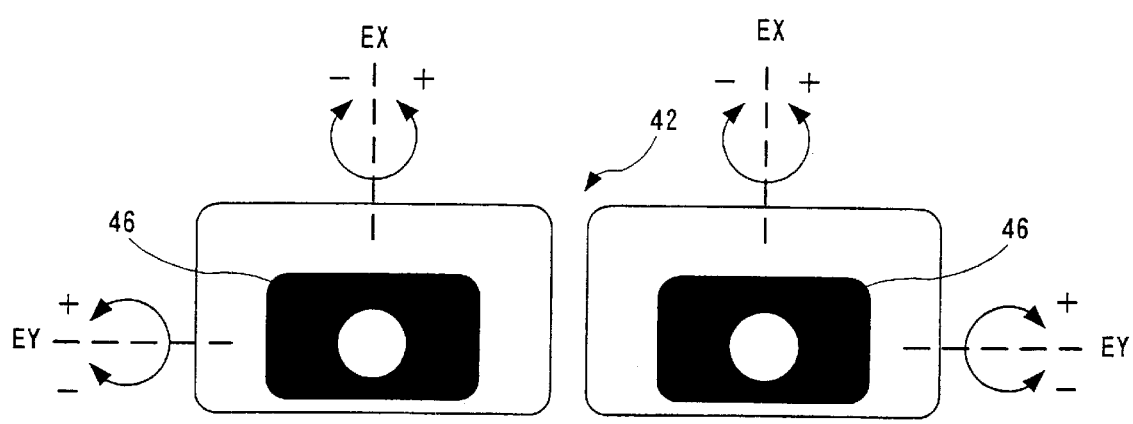
FIG. 8 is an illustrative view showing in detail a configuration of eye cameras of the FIG. 1 embodiment.

FIG. 8 is an illustrative view showing in detail eye cameras 46 mounted in the head 42 of the robot 10 of FIG. 1. FIG. 8 shows that the eye cameras 46 are to be moved about the X-axis and Y-axis (shown at EX and EY in FIG. 8. That is, in this FIG. 8 embodiment, the eye cameras 46 can be moved just like the human eyeballs. The movement of the eyeballs, or eye cameras 46, enables communications with the human.

Figure 9:
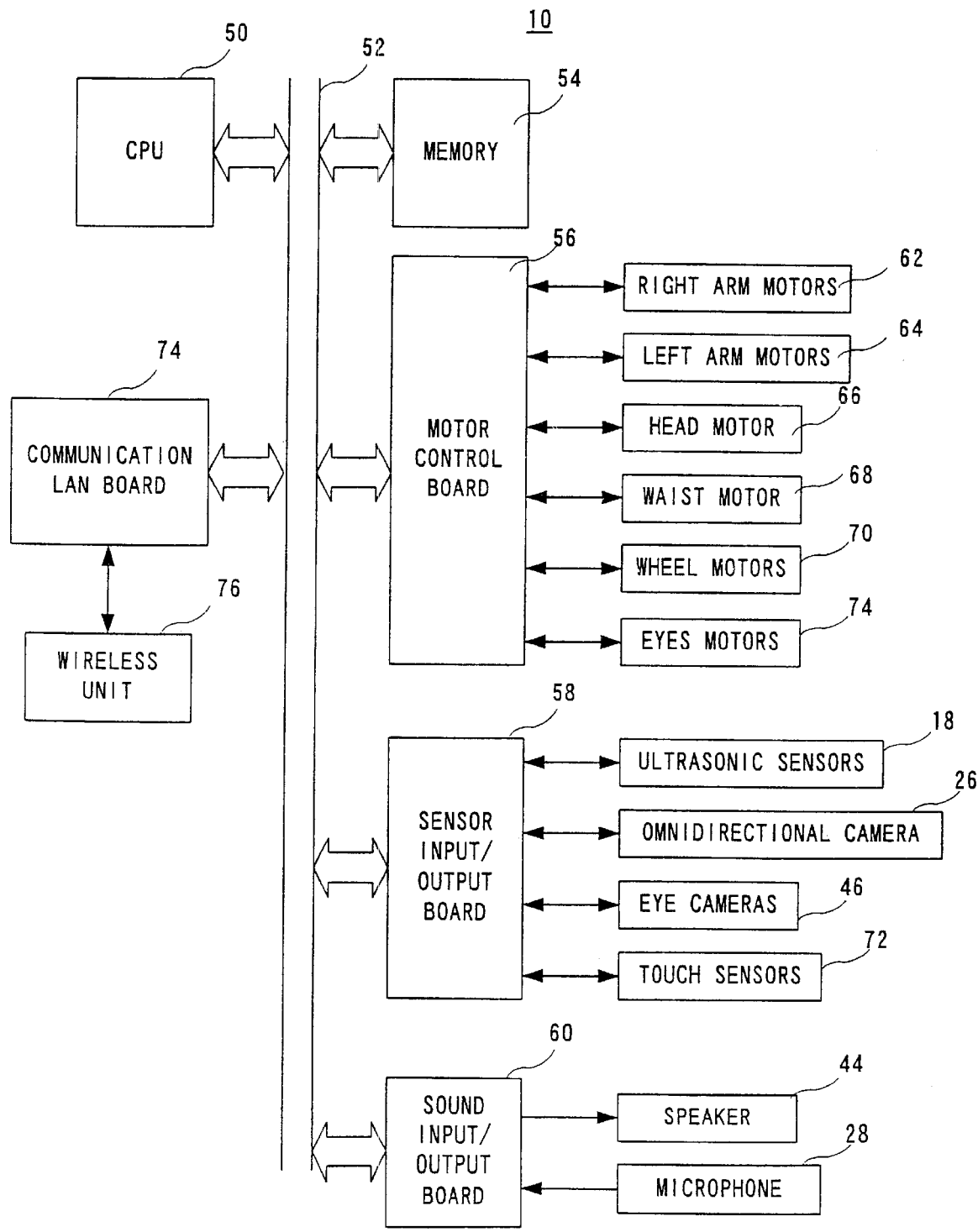
FIG. 9 is a block diagram showing an electrical configuration of a robot of the FIG. 8 embodiment.

The structure shown in FIG. 9 is employed in order to control the eye cameras 46 as in FIG. 8 on the EX and EY axes. In the block diagram of FIG. 9, eye motors 74 are under control of the motor control board 56. That is, the CPU 50 controls two eye motors 74 for driving the respective eye cameras 46 on the EX axis and EY axis through the motor control board 56, similarly to the other motors. Incidentally, the other parts of FIG. 9 are similar to those of the FIG. 2 block diagram.

In addition, the robot 10 in FIG. 9 has a communication LAN board 74 and a wireless unit 76. The communication LAN board 74 is structured by a DSP, and the board 74 receives the data sent from the CPU 50 and applies the same to the wireless unit 76 which wireless-transmits the data. Furthermore, the LAN board 74 receives the data via the wireless unit 76, and applies the received data to the CPU 76. The robot 10 in this embodiment shown can perform wireless communication with other robot (not shown) by utilizing the LAN board 74 and the wireless unit 76.

Figure 10:
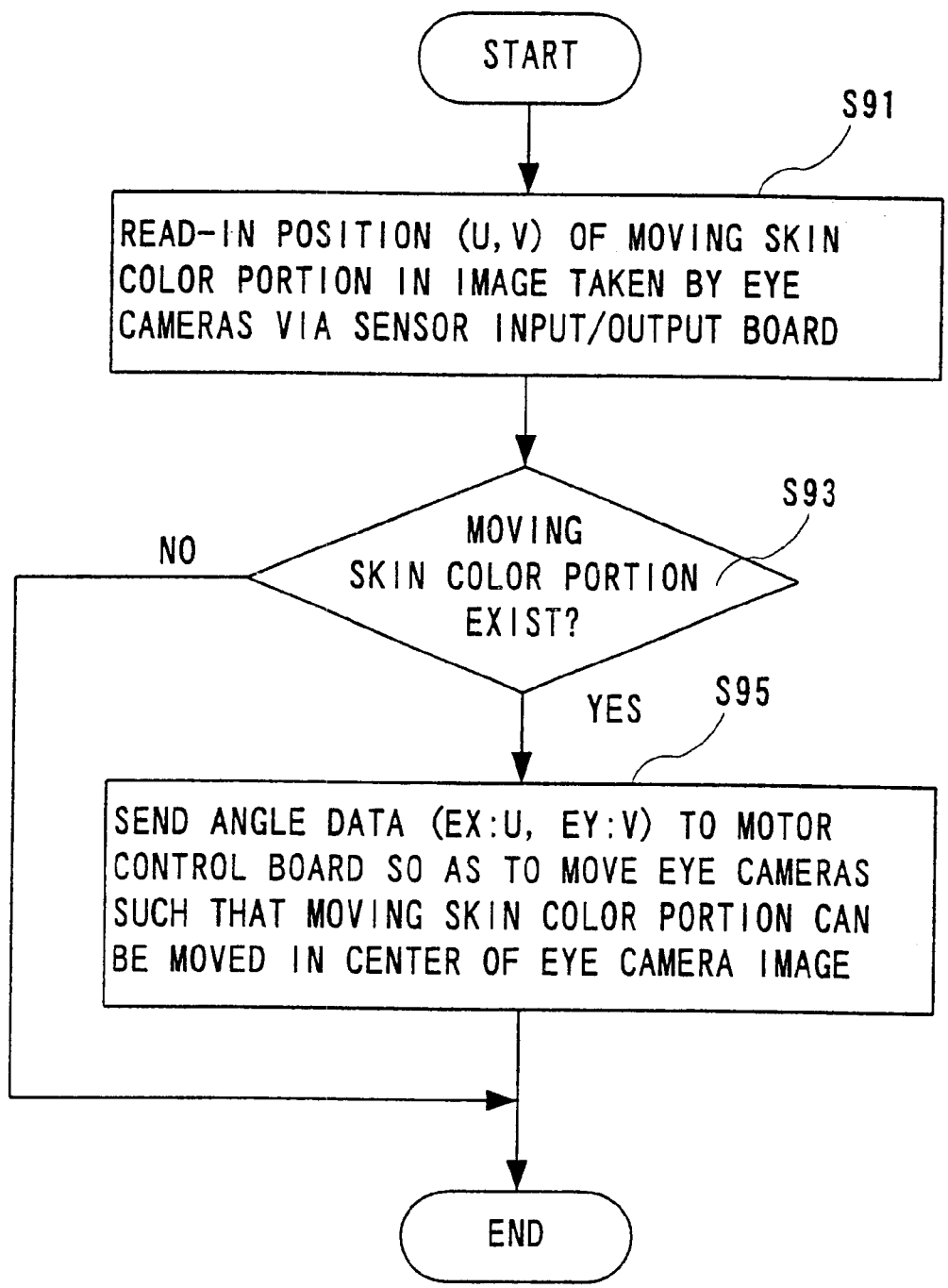
FIG. 10 is a flowchart showing the operation of the FIG. 8 embodiment.

In the embodiment of FIG. 8 and FIG. 9, in the first step S91 of FIG. 10, the CPU 50 first reads a position (U, V) of a skin-colored part moving in the video image taken by the eye camera 46 (FIG. 8). That is, in the step S91 an image signal from the eye camera 46 is inputted to the sensor input/output board 58. By processing the image signal in the sensor input/output board 58, detected is a skin-colored part in the video image (part corresponding to the human face) and a position U, V of the skin-colored part, i.e. human face. The position data is supplied to the CPU 50. Accordingly, the CPU 50 in the step S91 reads the position data of a human face (skin-colored part) from the sensor input/output board 58.

In the next step S93, the CPU 50 determines whether there is a moved skin-colored part (face) or not.

Determining "YES" in the step S93, the CPU 50 in the next step S95 forwards the angle data to the motor control board 56 and controls the eye motor 74 (FIG. 9) such that the eye camera 46 is moved by U degrees about the EX-axis and by V degrees about the EY-axis. This allows the eye camera 46 to move the human face (skin colored part) to a center region of the eye camera 46. That is, the eye camera 46 tracks the human face to enable the eye contact between the robot 10 and the human.

Figure 11:
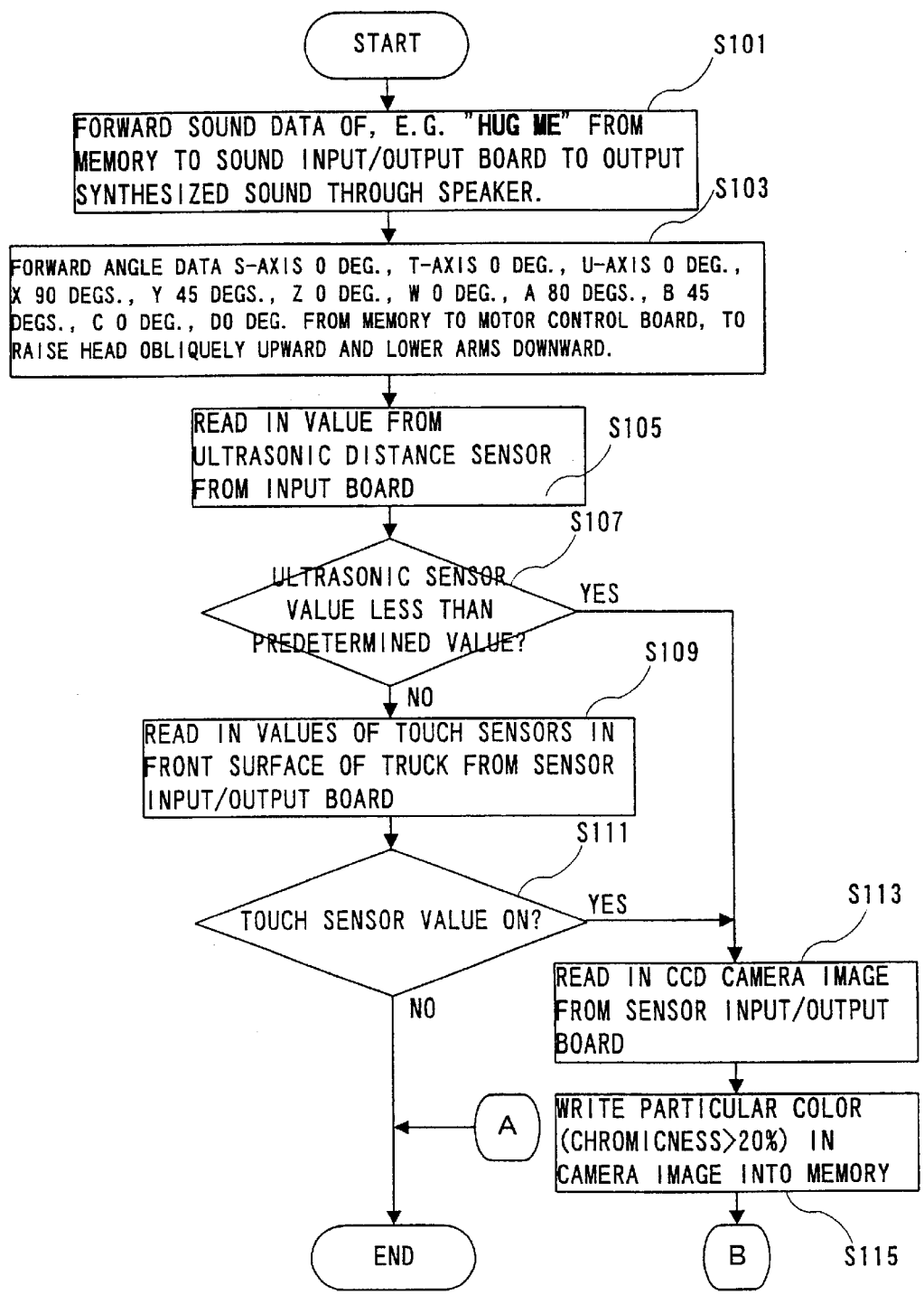
FIG. 11 is a flowchart showing a part of an action that the robot runs after and makes a greeting to the human who have hugged the robot.
Figure 12:
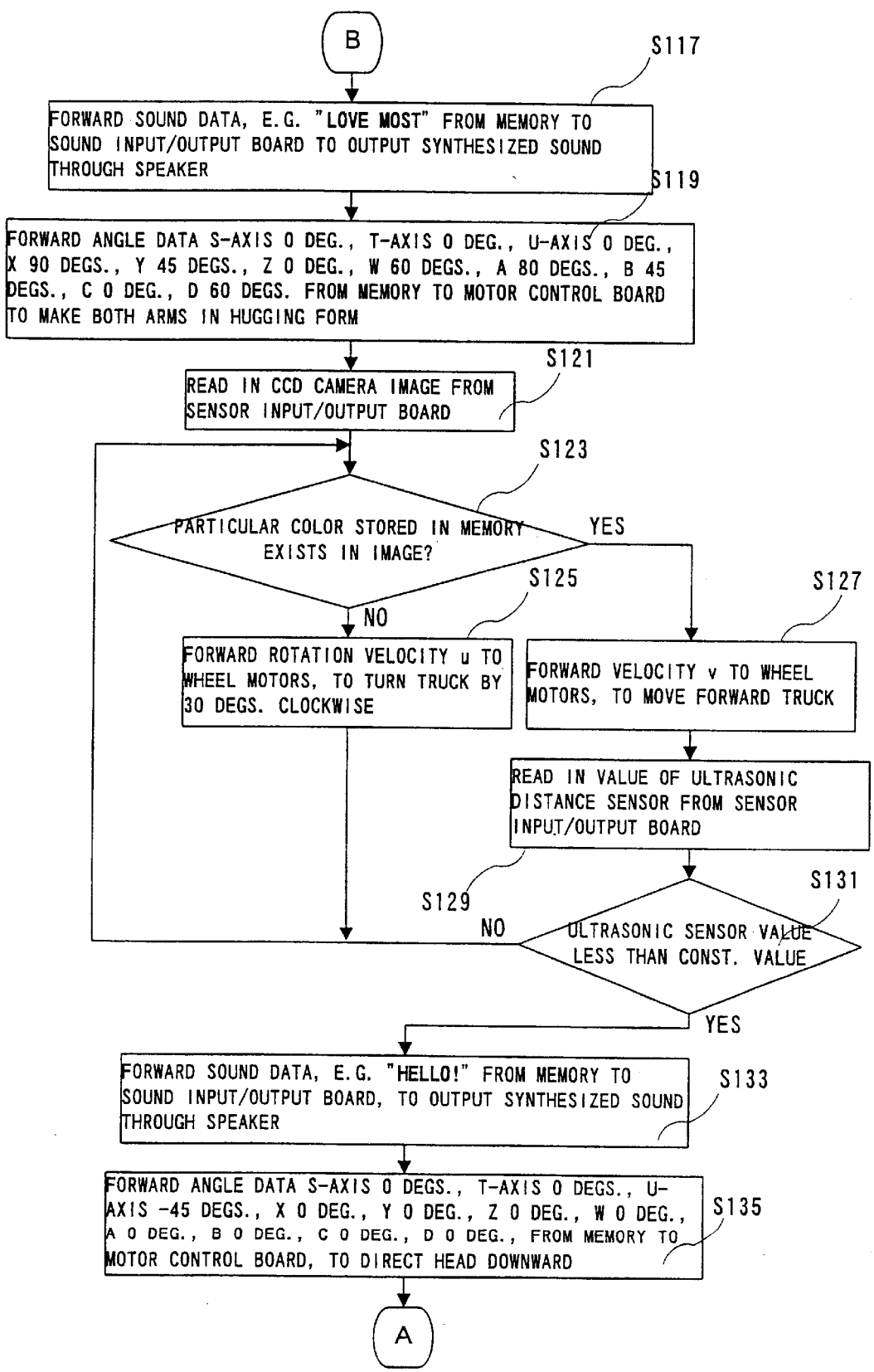
FIG. 12 is a flowchart showing another part of the action that the robot runs after and makes a greeting to the human who have hugged the robot.

FIG. 11 and FIG. 12 is a flowchart showing an action that the robot 10, remembering a person who have once hugged, finds and greets that person.

In the first step S101 in FIG. 11, the CPU 50 forwards sound data from the memory 54 to the sound input/output board 60. Consequently, synthesized voice "Hug me" is outputted through the speaker 44.

In step S103, the CPU 50 forwards angle data from the memory 54 to the motor control board 56 such that the robot 10 directs at head 42 (FIG. 1) toward the obliquely upward and at the arms downward. Specifically, an angle "90" is provided to the motor for adjusting the rotation angle on the X-axis in FIG. 1, an angle "80" is to the motor for adjusting the rotation angle on the A-axis, an angle "45" is to the motor for adjusting the rotation angle on the Y-axis and B-axis, and "0" to all the remaining motors. Consequently, in step S43 the head 42 of the robot 10 stands upright, the arm 32R is rotated by 90 degrees about the X-axis and by 45 degrees about the Y-axis, and the arm 32L is rotated by 80 degrees about the A-axis and by 45 degrees about the D-axis.

Accordingly, the arms 32R and 32L are stretched obliquely forward of the robot 10 in a state in line with the front arms 36R and 36L. This state expresses that the robot 10 is pressing for "hugging".

In the following step S105, the CPU 50 fetches a distance value from the ultrasonic distance sensor 18 (FIG. 1) through the sensor input/output board 58. That is, in the step S105 the signal from the ultrasonic distance sensor 18 is inputted to the sensor input/output board 58.

The CPU 50 in the next step 107 determines whether the distance data inputted from the sensor input/output board 58 is equal to or smaller than a predetermined value or not. The "distance" equal to or smaller than the predetermined value means that the human goes near the robot 10. If "YES" is determined in the step S107, the process proceeds to step S113. Meanwhile, if "NO" is determined in the step S107, the CPU 50 in step S109 reads a value of the touch sensor (not shown) in the front surface of the truck 12. Then, the CPU 50 in step S111 determines whether the value read from the touch sensor represents "touch sensor ON" or not. If "YES" is determined in the step S111, i.e. if the human has contacted the front surface of the truck 12 of the robot 10 is determined, the process proceeds to step S113.

In step S113 the image signal from the eye camera 46 is fetched into the sensor input/output board 58, and in step S115 the image signal is processed in this board 58. This detects a particular color having a chromaticness of 20% or greater contained in the camera image. The detected particular color is stored in the memory 54. Accordingly, the robot 10 memorizes, for example, a dress color of the human who is approaching for hugging.

In the following step S117, the CPU 50 forwards the sound data from the memory 54 to the sound input/output board 60. Consequently, synthesized voice "Love most" is outputted through the speaker 44.

In step S119, the angle data is forwarded from the memory 54 to the motor control board 56 such that the head 42 of the robot 10 stands upright and the front arms 36R and 36L are bent. Specifically, an angle "90" is given to the motor for adjusting the rotation angle on the X-axis of FIG. 1, an angle "80" is to the motor for adjusting the rotation angle on the A-axis, an angle "45" is to the motor on the Y-axis and B-axis, an angle "60" is to the motor on the W-axis and D-axis, and an angle "0" is to all the remaining motors. Accordingly, in the step S117, the front arms 36R and 36L are bent in order to hug the human in the arms of the robot 10.

In the following step S121, the image signal from the eye camera 46 is again taken into the sensor input/output board 58 to process the image signal in this board 58. In step S123, it is determined whether the particular color stored in the memory 54 in the step S115 is contained in the fetched image or not. If not contained, the CPU 50 in step S125 the CPU 50 provides the motor control board 56 with angle data to rotate the wheel motor, thereby rotating the truck by 30 degrees clockwise. Then, the process returns to the step S123. On the other hand, if it is determined in the step S123 that the particular color is contained in the image, the CPU 50 in step S127 provides the motor control board 56 with a velocity to rotate the wheel motor and move the truck forward.

Next, the CPU 50 in step S129 fetches a distance value from the ultrasonic distance sensor 18 through the sensor input/output board 58. In step S131, the CPU 50 determines whether the distance data inputted from the sensor input/output board 58 is equal to or smaller than a predetermined value or not. If "NO" is determined in the step S131, the process returns to the step S123 wherein it is again determined whether the particular color is contained in the image obtained from the eye camera 46 or not.

Meanwhile, if "YES" is determined in the step S131, i.e. if the hugging human exists nearby, the CPU 50 in step S133 forwards sound data from the memory 54 to the sound input/output board 60. Consequently, synthesized voice "Hello!" is outputted through the speaker 44.

Finally, the CPU 50 in step S135 forwards angle data from the memory 54 to the motor control board 56 such that the head 42 of the robot 10 is directed downward. Specifically, an angle "−45" is given to the motor for adjusting the rotation angle on the U-axis shown in FIG. 1, and an angle "0" is given to all the remaining motors. Accordingly, in the step S133 the robot 10 takes a posture of bow with head directed downward.

Figure 13:
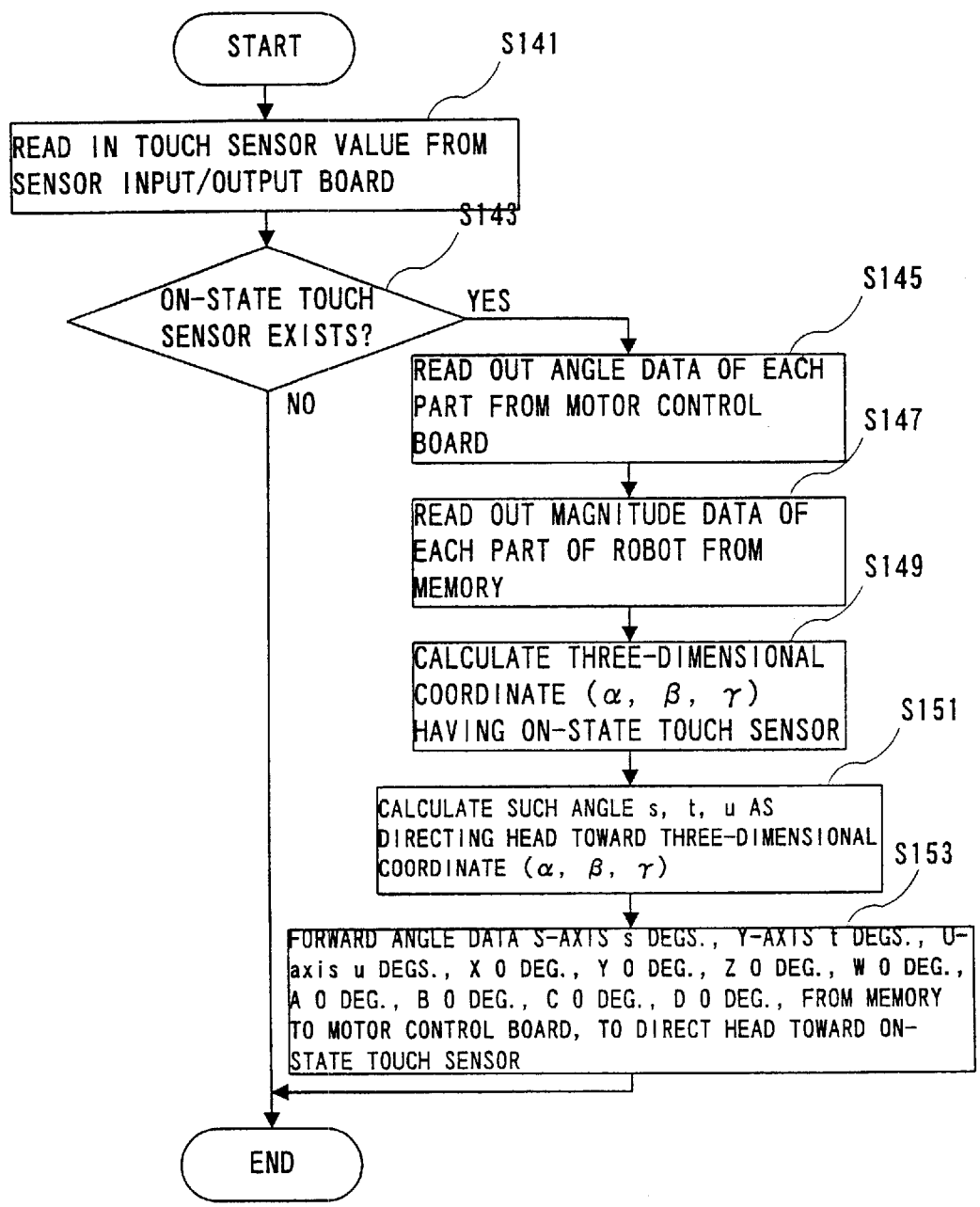
FIG. 13 is a flowchart showing an action that the robot look at a point touched by the human.

In the FIG. 11 and FIG. 12 embodiments, when the human comes for hugging responsive to the call "Hug me" from the robot 10, the robot 10 remembers a particular color, such as dress color, of the human and goes near and makes a bow to the once-hugged human with resort to the remembered feature color. FIG. 13 is a flowchart showing the action that, when the human contacts the robot 10, the robot 10 looks at a contacted point.

In the first step S141 of FIG. 13, the CPU 50 reads a signal from the touch sensor through the sensor input/output board 58. It is determined in step S143 whether there is a touch sensor showing a value representative of "touch sensor ON" or not. If "NO" is determined in the step S143, the process ends. Meanwhile, if "YES" is determined in the step S143, the process proceeds to step S145.

In step S145, the joint angle data in various part of the robot 10 is read out of the motor control board 56. In the following step S147, the magnitude data of the various parts of the robot 10 is read out of the memory 54. In step S149, a three-dimensional coordinate ($\alpha, \beta, \gamma$) of an on-state touch sensor is calculated from the magnitude data and joint angle data. In the following step S151, calculated is a rotation angle about the S-axis, rotation angle t about the T-axis and rotation angle u about the U-axis of FIG. 1 such that the head 42 of the robot 10 is directed toward the three-dimensional coordinate ($\alpha, \beta, \gamma$) where the on-state touch sensor exists.

Finally, in step S153 the head of the robot 10 is tilted to look at a point touched by the human. Specifically, an angle "s" is given to the motor for adjusting the rotation angle on the S-axis, an angle "t" is to the motor for adjusting the rotation angle on the T-axis, an angle "u" is to the motor for adjusting the rotation angle on the U-axis, and an angle "0" is to all the remaining motors. Accordingly, in the step S153, the head 42 of the robot 10 is tilted by the angle s about the S-axis, by the angle t about the T-axis and by the angle u about the U-axis, thus being directed toward a direction that the on-state touch sensor exists.

Consequently, if the human touch the robot 10, the robot 10 at the head 42 behaves to look at the point touched by the human. In this manner, the robot 10 of this embodiment can deepen the communication with the human.

Figure 14:
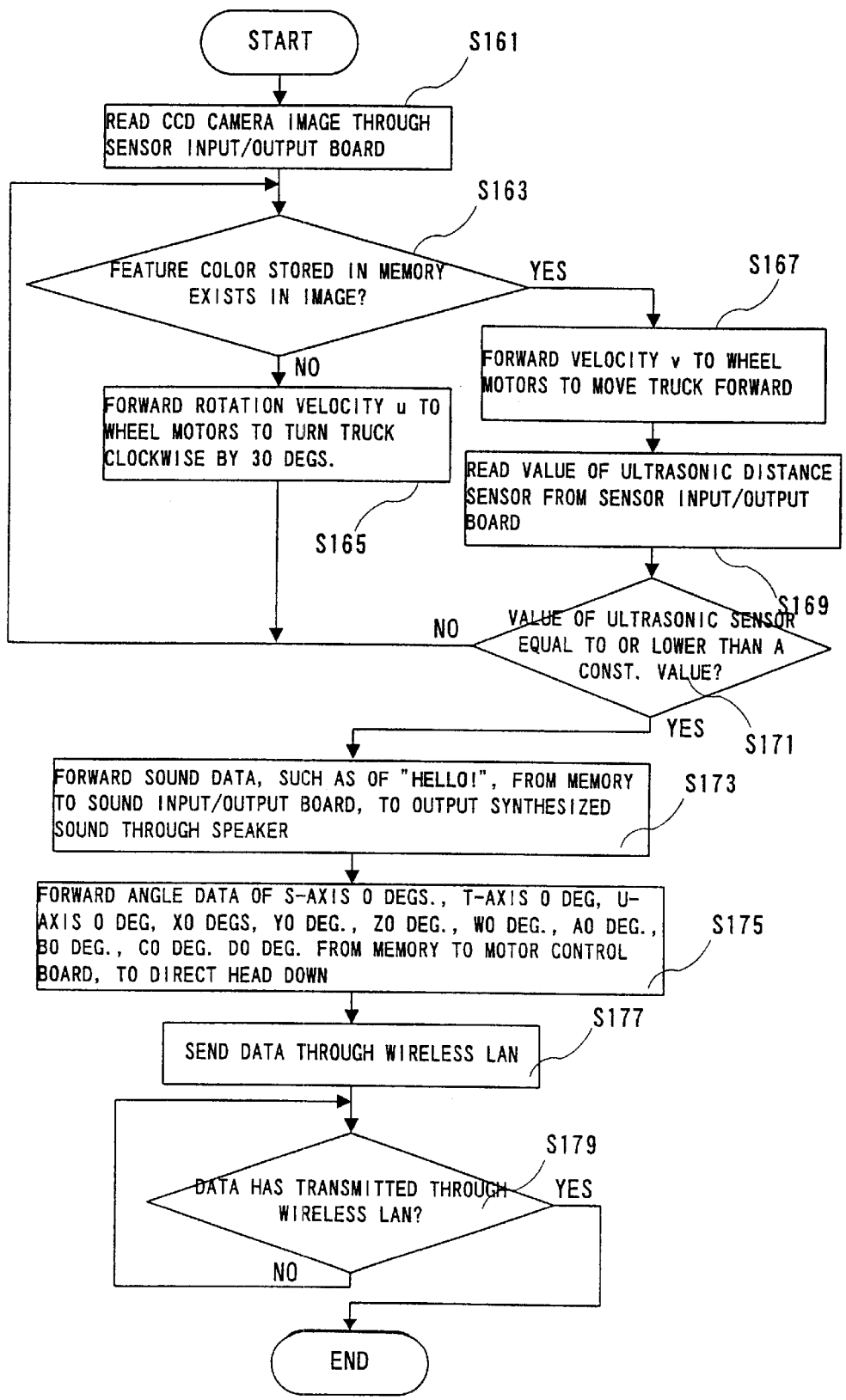
FIG. 14 is a flowchart showing an example of an action that the robots in communication inform the human thereof.
Figure 15:
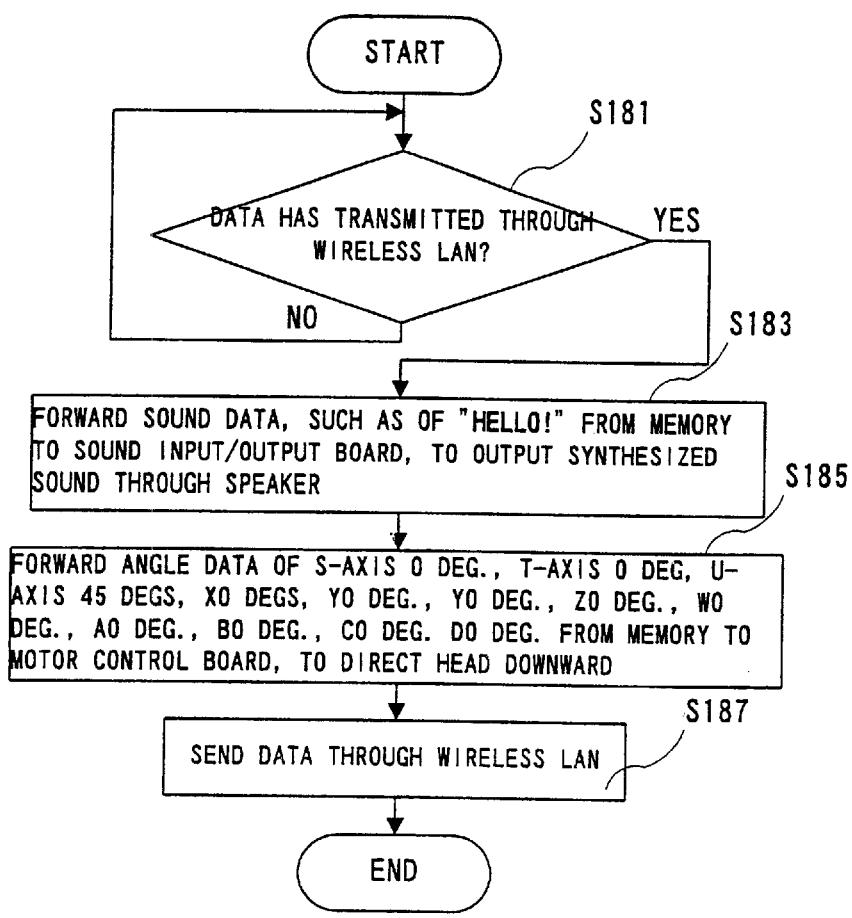
FIG. 15 is a flowchart showing another example of the action that the robots in communication inform the human thereof.

FIG. 14 and FIG. 15 shows a flowchart showing an action that, when the robots 10 are in communication with each other, the communication of the robots 10 is made known to the human through sound.

The flowcharts of FIG. 14 and FIG. 15 represent actions of the individual robots 10 to be executed simultaneously and independently.

First, explained are step S161 to step S171 of FIG. 14. Herein, the steps S161, 163, 165, 167, 169 and 171 of FIG.

14 are similar to the steps S121, 123, 125, 127, 129 and 131 of FIG. 12 explained above, and hence duplicated explanations will be omitted. The steps S161 to step S171 shows the action that one robot 10 finds the other robot 10 and approaches the other robot 10 to a constant distance or smaller according to an output value of the ultrasonic sensor 18. Incidentally, the one robot 10 is memorized, in advance in the memory 54, with a particular color of the other robot 10.

If "YES" is determined in step S171, i.e. if the one robot 10 moves to a vicinity of the other robot 10, the CPU 50 of the one robot 10 in step S173 of FIG. 14 forwards sound data from the memory 54 to the sound input/output board 60. Consequently, synthesized voice "Hello!" is outputted through the speaker 44.

In the following step S175, the head 42 is lowered downward. Specifically, an angle "−45" is given to the motor for adjusting the rotation angle on the U-axis of FIG. 1, and an angle "0" is to the remaining motors. Accordingly, in the step S173 the one robot 10 takes a posture of making a bow to the other robot 10.

In the steps S173 and Sd175, when a greeting of Hello is done, the one robot 10 having greeted, in step S177, sends data to the other robot to through a wireless LAN.

When the one robot 10 sends the data, the other robot 10 in step S181 of FIG. 15 determines data transmission through the wireless LAN and receives the data.

Receiving the data, the other robot 10 at the CPU 50 in step S183 forwards sound data from the memory 54 to the sound input/output board 60. Consequently, synthesized voice "Hello!" is outputted through the speaker 44.

In the following step S185, the head 42 is directed downward. Specifically, an angle "−45" is given to the motor for adjusting the rotation angle on the U-axis of FIG. 1, and an angle "0" is to the remaining motors. Accordingly, in step S183, the other robot 10 takes a posture of greeting to the one robot 10.

In step S187, the other robot 10 sends data to the one robot 10 through the wireless LAN.

Thereupon, the one robot 10 at the CPU 50, in step S179 of FIG. 14, determines data transmission from the other robot 10 through the wireless LAN and receives the data.

In this manner in the embodiment of FIG. 14 and FIG. 15, when the robots 10 make communications with data exchange or the like, they make greetings with bows, thereby informing the human of the communications between the robots 10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication robot, comprising:
    a truck;
    a body provided on said truck;
    a movable arm attached on said body through a shoulder joint;
    a head attached on said body through a neck joint;
    a speaker; and
    first sound signal providing means for providing a first sound signal to said speaker such that a first sound is generated through said speaker to request for a human to make a certain action.

2. A communication robot according to claim 1, further comprising first arm moving means for controlling said shoulder joint to move said movable arm in relation to generation of the request sound such that a movement of said movable arm supplements the first sound.

3. A communication robot according to claim 2, further comprising second arm moving means for controlling said shoulder joint to move said movable arm in a manner cooperating with the human when the human makes the action.

4. A communication robot according to claim 3, further comprising head moving means for controlling said neck joint to move said head in relation to generation of the first sound such that a movement of said head supplements the request sound.

5. A communication robot according to claim 2, further comprising head moving means for controlling said neck joint to move said head in relation to generation of the first sound such that a movement of said head supplements the request sound.

6. A communication robot according to claim 1, further comprising head moving means for controlling said neck joint to move said head in relation to generation of the first sound such that a movement of said head supplements the request sound.

7. A communication robot, comprising:
    a truck;
    a body provided on said truck;
    a movable arm attached on said body through a shoulder joint;
    a head attached on said body through a neck joint;
    a speaker;
    first sound signal providing means for providing a first sound signal to said speaker such that a first sound is generated through said speaker to request for a human to make a certain action; and
    second sound signal providing means for providing a second sound signal to said speaker to generate a second sound through said speaker after the human has made the action responsive to the request sound.

8. A communication robot according to claim 7, further comprising a touch sensor provided on said truck, wherein said second sound signal providing means provides the second sound signal to said speaker when said touch sensor is on.

9. A communication robot, comprising:
    a truck;
    a body provided on said truck;
    a movable arm attached on said body through a shoulder joint;
    a head attached on said body through a neck joint;
    a speaker;
    first sound signal providing means for providing a first sound signal to said speaker such that a first sound is generated through said speaker to request for a human to make a certain action;
    an eye camera provided in said head;
    determining means for determining, based upon an image from said eye camera, whether a big object is approaching or not; and
    third sound signal providing means for providing a third sound signal to said speaker to generate a third sound through said speaker when said determining means determines an approach of said big object.

10. A communication robot, comprising:

a truck;

a body provided on said truck;

a movable arm attached on said body through a shoulder joint;

a head attached on said body through a neck joint;

a speaker;

first sound signal providing means for providing a first sound signal to said speaker such that a first sound is generated through said speaker to request for a human to make a certain action;

an eye camera provided in said head;

position detecting means for detecting a position of a skin-colored part on the basis of an image from said eye camera; and eye camera displacing means for moving said eye camera such that said eye camera is aligned to the position of the skin-colored part.

11. A communication robot, comprising:

a truck;

a body provided on said trucks, wherein said body includes a lower body and an upper body;

a moveable arm attached on said body through a shoulder joint;

a head attached on said body through a neck joint;

a speaker;

first sound signal providing means for providing a first sound signal to said speaker such that a first sound is generated through said speaker to request a human to make a certain action; and elevation means for elevating said upper body.

12. A communication robot according to claim 11, further comprising an omnidirectional camera; and height detecting means for detecting a height of the human on the basis of an image of said omnidirectional camera, wherein said elevation means raises and lowers said upper body depending upon the height.

13. A communication robot, comprising:

a truck;

a body provided on said truck;

a movable arm attached on said body through a shoulder joint;

a head attached on said body through a neck joint;

an eye camera provided in said head;

color detecting means for detecting a particular color on the basis of an image from said eye camera;

position detecting means for detecting a position of the particular color on the basis of the image from said the camera; and moving means for moving said truck to a position of the particular color.

14. A communication robot according to claim 13, further comprising sound signal providing means for providing a sound signal to said speaker to generate through said speaker a sound requesting for the human to make a certain action.

15. A communication robot according to claim 14, further comprising arm moving means for controlling said shoulder joint to move said movable arm in relation to a generation of the request sound such that a movement of said movable arm supplements the sound.

16. A communication robot, comprising:

a truck;

a body provided on said truck;

a movable arm attached on said body through a shoulder joint;

a head attached on said body through a neck joint;

a touch sensor provided on said shoulder joint and said movable arm; and head moving means for moving a head toward a direction that said touch sensor in an on-state exists by controlling said neck joint.

17. A communication robot according to claim 16, further comprising coordinate calculating means for calculating a three-dimensional coordinate having said touch sensor in an on-state, wherein said head moving means controllers said neck joint such that said head is directed toward a direction of the three-dimensional coordinate calculated by said coordinated calculating means.

18. A communication robot, comprising:

a truck;

a body provided on said truck;

a movable arm attached on said body through a shoulder joint;

a head attached on said body through a neck joint;

a speaker;

communication means for exchanging data with another communication robot; and sound signal providing means for providing a sound signal to said speaker to generate a sound informing a human of communication made by said communication means through said speaker.

19. A communication robot according to claim 18, further comprising head moving means for controlling said neck joint to move said head in relation to a generation of the sound such that the movement of said head supplements the sound.

* * * * *